Jan. 30, 1945.  E. LABIN  2,368,551

DIRECT READING PHASEMETER

Filed Sept. 23, 1943   3 Sheets-Sheet 1

EDOUARD LABIN
INVENTOR.

BY

ATTORNEY

Jan. 30, 1945.  E. LABIN  2,368,551
DIRECT READING PHASEMETER
Filed Sept. 23, 1943  3 Sheets-Sheet 2

EDOUARD LABIN
INVENTOR.

BY

ATTORNEY

Jan. 30, 1945.          E. LABIN          2,368,551
DIRECT READING PHASEMETER
Filed Sept. 23, 1943          3 Sheets-Sheet 3

EDOUARD LABIN
INVENTOR.

BY

ATTORNEY

Patented Jan. 30, 1945

2,368,551

UNITED STATES PATENT OFFICE 2,368,551

DIRECT READING PHASEMETER

Edouard Labin, Buenos Aires, Argentina, assignor to Hartford National Bank and Trust Company, Hartford, Conn., as trustee Application September 23, 1943, Serial No. 503,551

15 Claims. (Cl. 172—245)

The present invention relates to a method for measuring the phase-angle of two oscillations of the same frequency, and more particularly to a direct reading phasemeter circuit.

The measurement of the phase relationship between two oscillations of the same frequency, in spite of its importance in radio electricity, can only be accurately determined for frequencies not higher than 1 mc./s. by the use of a relatively elaborate circuit wherein the relative phase-angle of two oscillations is reduced to zero by shifting the phase of one of the oscillations through the means of a calibrated phase-shifting circuit.

But this method, apart from being complicated, does not give a direct reading of the phase-angle and, as already stated above, the results thereof are only accurate for frequencies up to 1 mc./s., which means that no practical and effective solution has as yet been found for the problem of accurately measuring the phase-angle in higher frequencies.

It has been suggested to measure the phase-angle of two oscillations of higher frequency by the use of multiplying mixer devices wherein the product of said oscillations will show a current component proportional to the cosine of the phase-angle of said oscillations. However, due to the fact that such current component varies with the amplitude of the oscillations, the use of mixer means has met with considerable practical difficulties.

The present invention provides a simple and accurate method of measuring the phase-angle of two oscillations of the same frequency, by taking advantage of the fact that the product of two oscillations, obtained through the use of a multiplying mixer means, contains a direct current component proportional to the cosine of the phase-angle of said oscillations, and also an alternating current component of double frequency the amplitude of which corresponds exactly to the factor of proportionality of said direct current component. Therefore, by rectifying the alternating current component, it is possible to compare both currents in an indicating device responsive to the quotient thereof, the deflection of the instrument pointer thus being proportional only to the cosine of the phase-angle, independently from the amplitude and frequency of the oscillations.

Therefore, one of the main objects of the present invention is to obtain in an indicating device a deflecting torque which will very accurately determine the phase-angle of two oscillations.

A further object of the invention is to obtain a direct and visual indication of the phase-angle of two oscillations.

A still further object of the invention is to provide a measuring method which will accurately work on the highest frequencies and which will not require adjustment of the measuring means.

Another object of the invention is to simplify the operation of a direct reading phasemeter by providing a single control dial which will adjust all of the variable elements of the circuit.

A further object of the present invention is to obtain a direct reading phasemeter provided with a linear-scale indicating instrument.

A still further object of the invention is to provide a compensation or autocompensation of the product of the mixture of the two oscillations, in order to simplify the separation of the useful components.

Other objects and advantages of the invention will become apparent from the course of the following description, when read in conjunction with the accompanying drawings, which illustrate the invention by way of example and in two preferred embodiments.

In the drawings.

The same reference characters are used to indicate like or corresponding parts or elements throughout the drawings.

Figure 1:
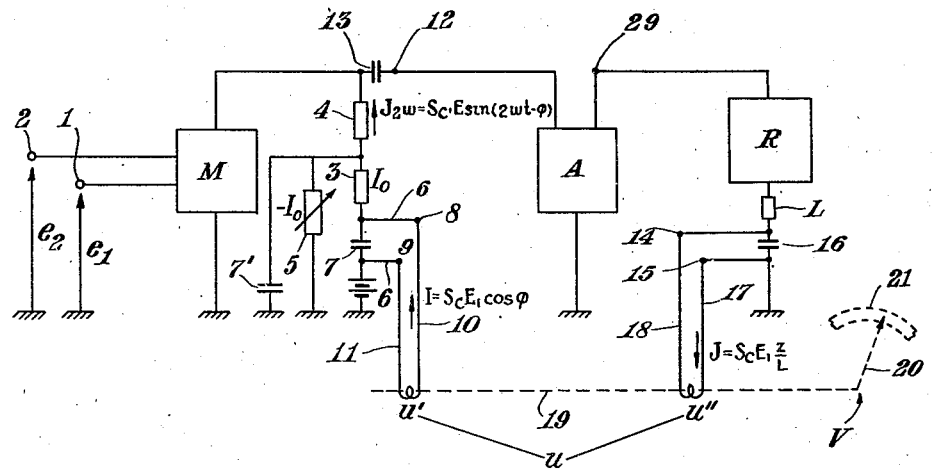
Fig. 1 is a diagram schematically showing one embodiment of the present invention.

Referring now to Figure 1, it may be seen that two oscillations $$e_1 = E_1 \sin \omega t \text{ and } e_2 = E_2 \sin (\omega t - \phi)$$

of the same frequency $\omega t$ but out of phase by an angle $\phi$, are connected to the input terminals 1 and 2 respectively, of a multiplying mixer M the output circuit of which comprises a resistance 3 and a choke-inductance 4 connected in series and by-pass condenser 7' in parallel with 3.

Mixer M is a pure multiplier, and the inputs 1 and 2 thereof should be perfectly screened in order to eliminate any possibility of electromagnetic or electrostatic induction between the inputs. The product of the two oscillations $e_1$ and $e_2$, which is generated by the mixer contains, apart from a constant direct current $I_0$ flowing in the mixer circuit, a further direct current component $I = S_c.E_1 \cos \phi$ and two alternating current components, $J_\omega = S_o.E_1 \sin \omega t$ and $J_{2\omega} = S_c.E_1 \sin (2\omega t - \phi)$, wherein $S_c$ is the so-called "conversion transconductance" of the mixer M and $S_o$ is the transconductance of said mixer M in the absence of oscillations $e_2$.

The foregoing equations show that the factor of proportionality $S_c.E_1$ of the cosine of the phase-angle $\phi$ is equal to the amplitude $S_c.E_1$ of the alternating current component of double frequency $J_{2\omega}$.

By providing separate outputs for these currents, it is therefore possible to compare both current components so that the result is proportional only to the cosine of the phase-angle $\phi$, and independent from the frequency and amplitude of oscillations $e_1$ and $e_2$.

The separation of said currents $I$ and $J_{2\omega}$ is carried out in the following manner:

The junction point of resistance 3 with inductance 4 is connected to compensating means 5, so that in that portion of the supply circuit of mixer M, constituted by said resistance 3 and conductor 6, the constant direct current $I_0$ is compensated by a direct current $-I_0$ provided by said compensating means 5.

By inserting a by-pass condenser 7 into said conductor 6, two output terminals 8 and 9 for the direct current component $I = S_c.E_1 \cos \phi$ are obtained, and this current flows through leads 10 and 11 to coil $u'$ of the control element $u$ of an indicating device V, which will be described hereinafter.

The other output terminal 12 of the mixer circuit is derived from the junction point of inductance 4 and the anode of mixer M by means of coupling condenser 13 and is coupled to means A for selectively amplifying the second harmonic current component $J_{2\omega}$. The impedance of selective amplifying means A for the fundamental alternating current component $J_\omega$ is negligibly small, so that for this component output terminal 12 can be regarded as connected directly to ground.

The output 29 of said selective amplifying means A is coupled to a linear rectifier means R which will only receive the alternating current component $J_{2\omega}$ and transform same into a direct current $$J = S_e \cdot E_1 \cdot \frac{Z}{L}$$

wherein Z represents the transfer-impedance of means A from point 12 up to the rectifier and L is the load resistance of the rectifier. Consequently, the rectified current J is derived from output terminals 14 and 15 of rectifier R shunted by filter condenser 16, said current flowing through leads 17 and 18 to the second coil $u''$ of said control element $u$.

Figure 3:
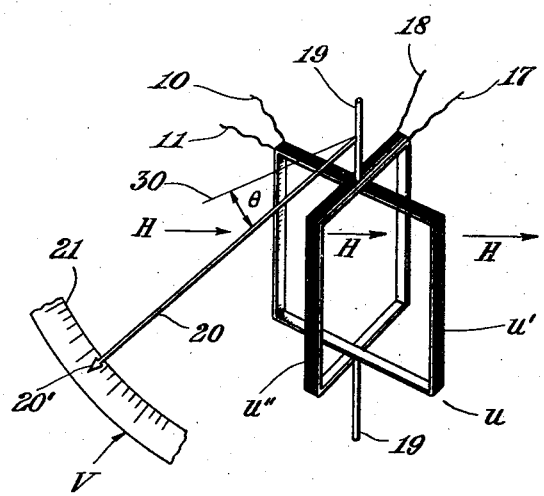
Fig. 3 represents a schematic view of the moving coil arrangement of an instrument used as indicating device in connection with the circuits of Figs. 1 and 2.

Referring to Figure 3, it may be observed that coils $u'$ and $u''$, constituting the control element $u$ of an indicating device V, are formed of wire loops placed in orthogonal planes and fixed at their intersecting portions to a common shaft 19 provided with a pointer 20 having a tip 20' acting over a scale 21.

Both coils $u'$ and $u''$ are placed within a uniform magnetic field H, and consequently due to this arrangement the torque exerted on the control element $u$ is proportional to the quotient of currents I and J flowing through coils $u'$ and $u''$, since the angular deflection $\theta$ of control element $u$ from its zero position 30 is proportional to $$tg\theta = \frac{G_I S_c \cdot E_1 \cdot \cos \phi}{G_J S_e \cdot E_1 \frac{Z}{L}} = G\frac{L}{Z} \cdot \cos \phi = A \cos \phi$$

where $G_I$ and $G_J$ are the galvanometric constants of the two coils $u'$, $u''$, and G their quotient. L/Z being constant, may be incorporated as an instrument constant in indicating device V, the deflection $\theta$ of pointer 20 thus being proportional to the cosine of the phase-angle $\phi$ of oscillations $e_1$ and $e_2$ only, and completely independent from the frequency and amplitude of said oscillations; it is thus possible to calibrate scale 21 of indicating device V directly in values of phase-angle $\phi$. The phasemeter circuit of Figure 1 in combination with indicating device V, consequently provides a direct visual indication of the phase-angle $\phi$ of two oscillations.

In view of the fact that the torque exerted on the control element $u$ of indicating device V is proportional to the cosine of the phase-angle $\phi$, there will be a relatively small angular deflection of pointer 20 for small values of the phase-angle the deflection increasing for higher values of $\phi$, so that the scale of the indicating device V is not linear.

Figure 4:
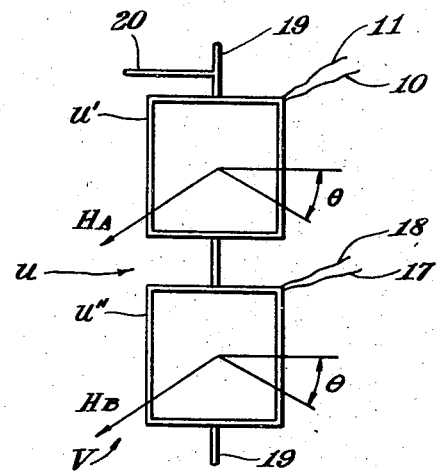
Fig. 4 is a schematic view of the moving coil arrangement of a different instrument used as an indicating device in connection with the circuits of Figs. 1 and 2.

The nonlinearity of the pointer deflection as a function of the phase angle $\phi$ may, in some instances, prove a disadvantage of the phasemeter according to the present invention. This difficulty, however, can be obviated by the use of an indicating device V having a control element modified as shown in Fig. 4. As can be seen in the drawings, coils $u'$ and $u''$ are coaxially mounted on a common shaft 19 and rotate in magnetic fields $H_a$ and $H_b$, respectively. The lines of force of magnetic field $H_a$, corresponding to coil $u'$, originate from a line coinciding with shaft 19 and are radially distributed over the area covered by coil $u'$ during the rotation thereof. Magnetic field $H_b$, corresponding to coil $u''$, is designed to provide a field strength varying as the sine of an angle evaluated from a fixed position coinciding with the zero deflection angle of coil $u''$.

Inasmuch as in a radial magnetic field the torque exerted on the coil is independent from the deflection angle whereas in a magnetic field varying with the sine of the deflection angle, the torque varies according to the cosine of the deflection angle of the coil, the control element $u$ shown in Figure 4 will be balanced when $$G_I \cdot \cos \phi = G_J \cdot \frac{Z}{L} \cdot \cos \theta$$

wherein $G_I \cos \phi$ is the torque exerted on coil $u'$ and $$G_J \cdot \frac{Z}{L} \cdot \cos \theta$$

is that exerted on coil $u''$. It is therefore possible to obtain a deflection of pointer 20 which will be directly proportional to the phase-angle $\phi$, by arranging the galvanometric constants of indicating device V so that $G_I$ is equal to $$G_J \cdot \frac{Z}{L}$$

thus providing an indicating device having a linear scale.

While a phasemeter according to the diagrammatic circuit of Figure 1, when combined with an indicating device V made in accordance with Figure 4, will provide a direct indication of the phase-angle $\phi$ on a linear scale, the calibration thereof will depend to a certain extent upon the stability of compensating means 5, inasmuch as a change in the compensation of the constant current $I_0$ would immediately cause an erroneous reading of the indicating device V.

Figure 2:
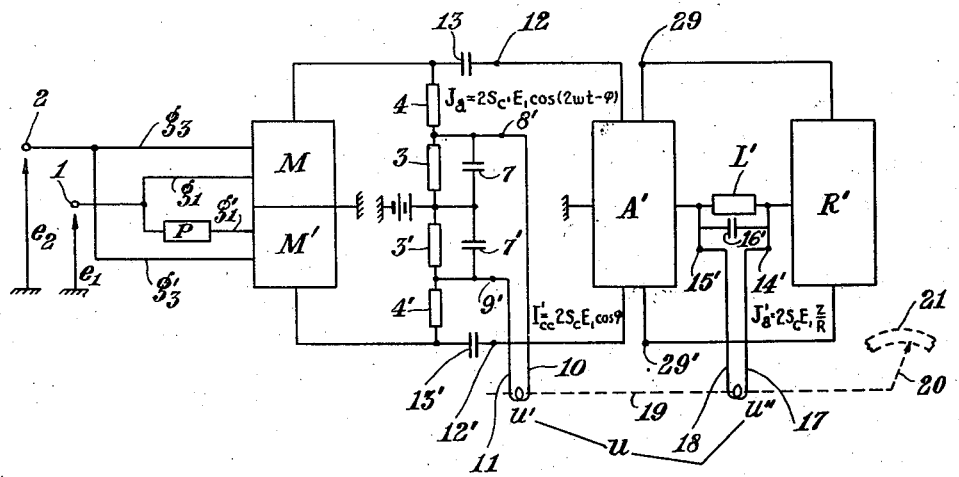
Fig. 2 is a diagram schematically showing a further embodiment of the invention.

Therefore, under certain circumstances, the push-pull phasemeter shown in Fig. 2 will be preferably used. As can be seen in the drawings, the push-pull phasemeter includes two similar mixer devices M and M' the plate circuits of which, comprising resistance 3, choke inductance 4 and resistance 3', inductance 4', respectively, are connected in push-pull, so that two products of oscillations $e_1$ and $e_2$, are obtained.

Oscillations $e_1$ and $e_2$ are connected to the respective individual inputs of said mixers M and M', one pair of said inputs, i. e. $g_3$ and $g_3'$, being connected in parallel, while the other pair i. e. $g_1$ and $g_1'$ is connected in push-pull, since $g_1'$ has an aperiodic phase inverter P connected in series therewith.

Due to the arrangement of mixers M and M', only the difference of the two products of said oscillations is present in the push-pull plate circuit of the mixers, such difference comprising mainly a direct current component $$I_{cc}' = 2.S_c.E_1. \cos \phi$$

and also an alternating current component $$J_{2\omega} = 2.S_c.E_1 \cos(2\omega t - \phi)$$

the maximum amplitude of which is equal to the factor of proportionality $2.S_c.E_1$ of the cosine of phase-angle $\phi$. The remaining direct and alternating current components which are present in the push-pull plate circuit of mixers M and M', and which comprise the constant currents of the individual mixer circuits together with several fundamental and parabolic terms, are either eliminated by the circuit or may be disregarded due to their negligible amplitudes.

The comparison of both currents $I_{cc}'$ and $J_{2\omega}'$ is carried out by deriving from the output terminals 8' and 9' a voltage which is proportional to the direct current $I_{cc}'$, and applying said voltage through leads 10 and 11 to coil $u'$ of the indicating device V. Output terminals 10 and 11 are located at the respective junction points at which resistance 3, inductance 4 and resistance 3', inductance 4' are connected, and due to this push-pull arrangement and to chokes 4 and the by-pass condensers 7', the alternating current $J_{2\omega}'$ will not flow through said coil $u'$, while the constant direct currents of mixers M and M' will be automatically compensated by symmetry, thus rendering unnecessary the use of auxiliary compensating means.

The alternating current component $J_{2\omega}'$ is derived from output terminals 12 and 12' which are connected through coupling and blocking condensers 13 and 13' respectively, to the corresponding ends of inductances 4 and 4', said output terminals being connected to selective amplifying means A', the output terminals 29 and 29' of which are coupled to linear full-wave rectifier means R', which only receives the alternating current $J_{2\omega}'$. Consequently, between output terminals 14' and 15' of the rectifying circuit, arranged at both ends of the load resistance L', a voltage proportional to the rectified current J' is obtained, and said voltage is applied through leads 17 and 18 to coil $u''$ of indicating device V, which, as stated above, is responsive to the quotient of both applied voltages, the deflection of pointer 20 thereof being directly proportional to the phase-angle $\phi$ of oscillations $e_1$ and $e_2$.

The push-pull circuit of Figure 2 not only renders unnecessary the use of auxiliary compensating means, but also supplies the control element $u$ of the indicating device V with voltages or currents of an amplitude which is twice that supplied by the circuit of Figure 1, whereby the construction of the corresponding indicating instrument is greatly simplified.

Figure 5:
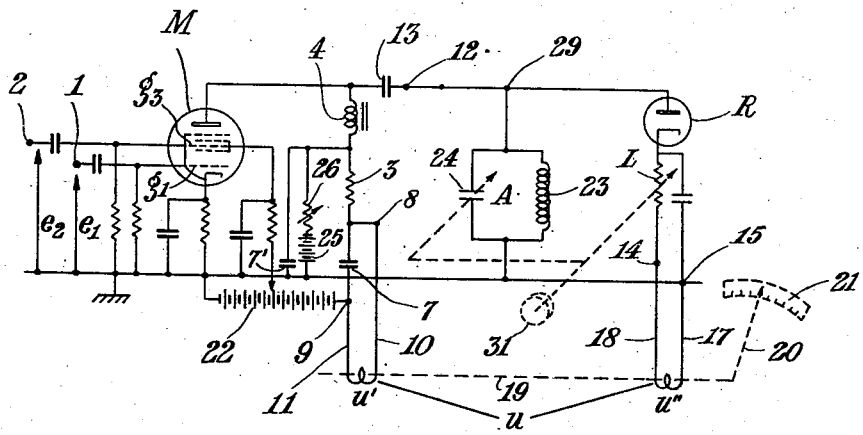
Fig. 5 is a diagrammatical representation of the straight-forward circuit of a direct reading phasemeter according to the present invention.

Figure 5 represents a direct reading phasemeter based on the diagrammatic circuit of Figure 1, wherein oscillations $e_1$ and $e_2$ are connected to the signal grid $g_1$ and oscillator grid $g_3$ respectively, of a multiplying mixer valve M, connected to a supply source 22 in any known manner.

Coil $u'$ of the control element $u$ is inserted in series with resistance 3 and inductance 4 constituting the plate circuit of said mixer valve M, while a resonant circuit A, constituted by an inductance 23 and a variable tuning condenser 24, is coupled to the output terminal 12 of said plate circuit.

A half-wave diode rectifier R is also coupled to the plate of mixer valve M, and coil $u''$ of the control element $u$ is connected in series with the variable load resistance L of the rectifying circuit.

The constant plate current $I_0$ of mixer valve M is compensated by voltage supply 25 and potentiometer 26 connected to the junction point of resistance 3 and inductance 4, so that only the direct current I, proportional to the cosine of the phase-angle $\phi$, will flow through coil $u'$ of the indicating device V.

The alternating current $J_{2\omega}'$ corresponding to the second harmonic of oscillations $e_1$ and $e_2$, is amplified by the resonant circuit A tuned to the same harmonic frequency, and rectified in the half-wave rectifier R, the rectified current J flowing through coil $u''$ of the indicating device V, where both direct currents I and J are compared as explained above.

Since a linear rectifier represents for the alternating current a resistance equal to L/2, which loads the selective circuit, the impedance Z of the resonant circuit A should not be larger than L/2. In general Z will be some fraction k of L ($k \leq \frac{1}{2}$), owing to the relation between L and the no load impedance $Z_0$ of the circuit. It is therefore possible to measure the phase-angle $\phi$ over a wide frequency range by changing the tuning of the resonant circuit, making the load L adjustable and connecting it in tandem with the variable tuning condenser 24, in order to keep the relationship k between Z and L constant at all frequencies.

Consequently, the phasemeter has only one operating knob 31, located on the variable condenser shaft, which will greatly simplify the measuring operation.

Figure 6:
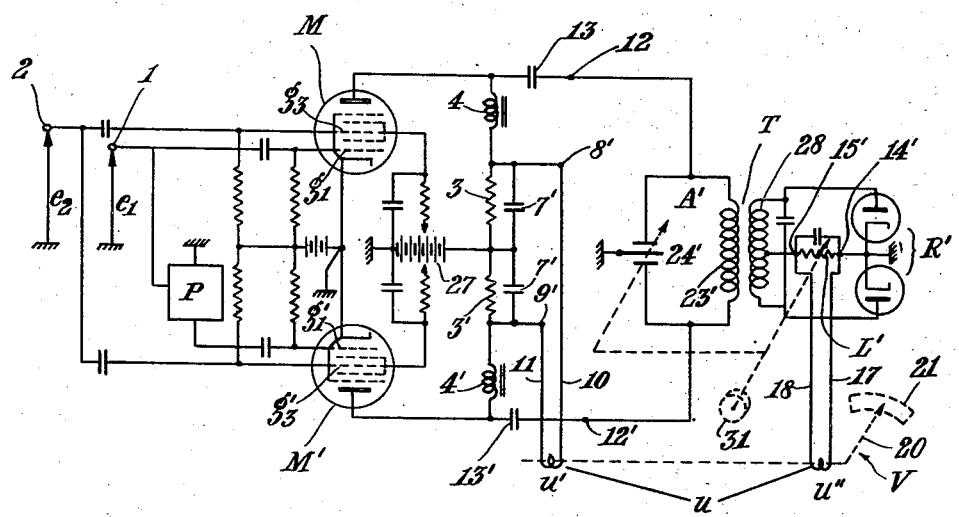
Fig. 6 is a diagrammatical representation of the push-pull circuit of a direct reading phasemeter according to the present invention.

Figure 6 represents the circuit of a direct reading phasemeter based on the diagram of Figure 2, wherein the input terminals 1 and 2 are connected to the signal grids $g_1$, $g_1'$ and oscillator grids $g_3$, $g_3'$ respectively, of two multiplying mixer valves M and M' of like characteristics, the plate circuits of which, constituted by 3, 4 and 3', 4' respectively, are connected in push-pull. The oscillator grids $g_3$ and $g_3'$ of said mixer valves are connected in parallel, while signal grids $g_1$ and $g_1'$ are connected in push-pull by means of an aperiodic phase inverter P, inserted in the lead between input terminal 1 and said signal grid $g_1'$ of mixer valve M'.

As already explained above, a voltage proportional to the direct current $I_\infty'$ is derived from the push-pull output terminals 8' and 9', while the alternating current of double frequency $J_{2\omega}'$ is derived from output terminals 12 and 12', coupled to resonant circuit A', constituted by an inductance 23' and a variable split stator condenser 24', said resonant circuit A' being tuned to the second harmonic frequency of oscillations $e_1$ and $e_2$.

Inductance 23' constitutes the primary of a transformer T, the secondary winding 29 of which corresponds to a full-wave rectifier circuit provided with the double-diode R'. The variable load resistance L' of said rectifier circuit is connected in tandem with the variable tuning condenser 24' in order to allow the measurement of the phase-angle $\phi$ over a wide range of frequencies.

A voltage proportional to the rectified current J' is derived from output terminals 14' and 15' of the rectifier circuit, said voltage being applied to coil $u''$ of indicating device V by means of leads 17 and 18, so that the deflection angle $\theta$ of pointer 20 will indicate the phase-angle $\phi$ of oscillations $e_1$ and $e_2$.

It is evident that several modifications and changes in construction and details may occur to those skilled in the art, without departing from the scope of the invention as clearly set forth in the appended claims.

I claim:

1. A method of measuring the phase-angle of two oscillations of the same frequency, independently of the amplitude thereof, which comprises obtaining the product of said oscillations by means of a multiplying mixer, separately deriving from said product a first direct current component proportional to the cosine of the phase-angle of said oscillations and an alternating current component corresponding to the second harmonic oscillation; rectifying said second harmonic oscillation so as to obtain a second direct current proportional to the amplitude thereof; and finally passing said two direct currents through an indicating device responsive to the quotient thereof, so as to produce an indication independently of the amplitude of said oscillations.

2. A method of measuring the phase-angle of two oscillations of the same frequency, independently of the amplitude thereof, which comprises connecting said oscillations in parallel and in push-pull to a pair of multiplying mixers and obtaining the products of said oscillations; taking the difference between said products of said mixers, by a push-pull connection of the outputs thereof separately deriving from said difference a first direct current component proportional to the cosine of the phase-angle of said oscillations and an alternating current component corresponding to a second harmonic oscillation; rectifying said second harmonic oscillation so as to obtain a direct current proportional to the amplitude thereof; and finally passing said currents through an indicating device responsive to the quotient thereof.

3. A direct reading phasemeter, comprising a circuit which includes means for obtaining the product of two oscillations of the same frequency and which, in combination with means for compensating the constant direct current of the circuit, includes two outputs; one of said outputs, corresponding to the direct current component of said product proportional to the cosine of the phase-angle of said oscillations, being connected to the control element of an indicating device, while the second output of said circuits is coupled to means for selectively amplifying the second harmonic oscillation component of said product; said selective amplifying means being coupled to rectifying means the output circuit of which is also coupled to another control element of said indicating device responsive to the quotient of the current passing through the control elements thereof.

4. A direct reading phasemeter, comprising a circuit which includes means for obtaining the product of two sinusoidal oscillations of the same frequency and which, in combination with means for compensating the constant direct current of the circuit, includes two outputs; one of said outputs corresponding to the direct current component of said product proportional to the cosine of the phase-angle of said oscillations, being connected to the control element of an indicating device, while the second output of said circuit is coupled to means for selectively amplifying the second harmonic oscillation component of said product; said selective amplifying means coupled to rectifying means the rectified current output thereof being also connected to another control element of said indicating device responsive to the quotient of the actuating currents.

5. A direct reading phasemeter, comprising a circuit which includes means for obtaining the product of two oscillations of the same frequency and which, in combination with means for compensating the constant direct current of the circuit, includes two outputs; one of said outputs corresponding to the direct current component of said product proportional to the cosine of the phase-angle of said oscillations, being connected to one of a pair of coils constituting the control element of an indicating device, while the second output of said circuit is coupled to means for selectively amplifying a second harmonic oscillation component of said product, said selective amplifying means being coupled to rectifying means the rectified current output of which is connected to the second coil of the control element of said indicating device responsive to the quotient of the actuating currents.

6. A direct reading phasemeter, comprising a circuit which includes means for obtaining the product of two oscillations of the same frequency and which, in combination with means for compensating the constant direct current of the circuit, includes two outputs; one of said outputs corresponding to the direct current component of said product proportional to the cosine of the phase-angle of said oscillations, being connected to one of a pair of coils constituting the control element of an indicating device, while the second output of said circuit is coupled to means for selectively amplifying a second harmonic oscillation component of said product, said selective amplifying means being coupled to rectifying means, the rectified current output of which is connected to the second coil of the control element of said indicating device responsive to the quotient of the actuating currents, said coils being orthogonally arranged on a common shaft and located within a uniform magnetic field.

7. A direct reading phasemeter, comprising a circuit which includes means for obtaining the product of two oscillations of the same frequency and which, in combination with means for compensating the constant direct current of said circuit, includes two outputs; one of said outputs corresponding to the direct current component of said product proportional to the cosine of the phase-angle of said oscillations, being connected to the first of a pair of coils constituting the control element of an indicating device, while the second of said outputs is coupled to means for selectively amplifying a second harmonic oscillation component of said product, said selective amplifying means being coupled to rectifying means the rectified current output of which is connected to the second of said control element coils, said first coil being located within a radial magnetic field, while the second coil, fixed to the shaft of the first coil, is located within a magnetic field varying according to the sine of the deflection angle of said control element of the indicating device.

8. A direct reading phase-meter, comprising a circuit which includes a multiplying thermionic mixer valve for obtaining the product of two oscillations of the same frequency, the signal and oscillator grids of said valve constituting the respective inputs for said oscillations, while the plate circuit of said valve, constituted by a parallel combination of an alternative-current branch and a choke-resistance branch for continuous current, comprises two outputs; one of said outputs corresponding to the direct current component of said product proportional to the cosine of the phase-angle of said oscillations and combined with means for compensating the constant plate current of said valve, is connected to the control element of an indicating device, the second output of said plate circuit being connected to means for selectively amplifying a second harmonic oscillation component of said product, said selective amplifying means being coupled to rectifying means, the rectified current output of which is also connected to said control element of said indicating device responsive to the quotient of the actuating currents.

9. A direct reading phasemeter, comprising a circuit which includes a multiplying thermionic mixer valve for obtaining the product of two oscillations of the same frequency, the signal and oscillator grids of said valve constituting the respective inputs for said oscillations, while the plate circuit of said valve, constituted by a parallel combination of an alternative-current branch and a choke-resistance branch for continuous current, comprises two outputs, one of said outputs corresponding to the direct current component of said product proportional to the cosine of the phase-angle of said oscillations, and combined with means for compensating the constant plate current of said valve, is connected to the control element of an indicating device, while the second output of said plate circuit being coupled to a variable parallel resonant circuit tuned to a second harmonic oscillation component of said product, said resonant circuit being coupled to rectifying means, the rectified current output of which is also connected to said control element of said indicating device responsive to the quotient of the actuating currents.

10. A direct reading phasemeter, comprising a circuit which includes a multiplying thermionic mixer valve for obtaining the product of two oscillations of the same frequency, the signal and oscillator grids of said valve constituting the respective inputs for said oscillations, while the plate circuit of said valve, constituted by a parallel combination of an alternative-current branch and a choke-resistance branch for continuous current, includes two outputs one of said outputs corresponding to the direct current component of said product proportional to the cosine of the phase-angle of said oscillations, and combined with means for compensating the constant plate current of said valve being connected to the control element of an indicating device, while the second of said outputs is coupled to a variable parallel resonance circuit tuned to a second harmonic oscillation component of said product, said resonant circuit being coupled to a diode rectifier provided with a variable load resistance, the rectified current output of said rectifier being also connected to the control element of said indicating device responsive to the quotient of the actuating currents.

11. A direct reading phasemeter of constant calibration for any frequency comprising a circuit which includes a multiplying thermionic mixer valve for obtaining the product of two oscillations of the same frequency, the signal and oscillator grids of said valve constituting the respective inputs for said oscillations, while the plate circuit of said valve, constituted by a parallel combination of an alternative-current branch and a choke-resistance branch for continuous current, includes two outputs one of said outputs corresponding to the direct current component of said product proportional to the cosine of the phase-angle of said oscillations, and combined with means for compensating the constant plate current of said valve being connected to the control element of an indicating device, while the second of said outputs is coupled to a parallel resonance circuit provided with a variable tuning condenser, said resonance circuit being coupled to a diode rectifier provided with a variable load resistance arranged in tandem with said variable tuning condenser, in order to maintain over all frequencies a constant ratio between the impedance of the resonant circuit and the resistance of the rectifier circuit, the rectified current output of said diode rectifier being also connected to the control element of said indicating device responsive to the quotient of the actuating currents.

12. A direct reading phasemeter, of constant calibration for any frequency, comprising a circuit which includes a multiplying thermionic mixer valve for obtaining the product of two oscillations of the same frequency, the signal and oscillating grids of said valve constituting the respective inputs for said oscillations, while the plate circuit of said valve, constituted by a parallel combination of an alternative-current branch, a choke-resistance branch for continuous current, and one of a pair of coils of the indicating device connected in said branch for continuous current, is combined with means for compensating the constant plate current of said valve, said plate of said mixer valve being coupled to one end of a parallel resonance circuit provided with a variable tuning condenser, the other end of said resonance circuit being connected to ground potential, said plate of said valve being also coupled to a diode rectifier provided with a variable load resistance arranged in tandem with said variable tuning condenser, in order to maintain over all frequencies a constant ratio between the impedance of the resonant circuit and the resistance of the rectifier circuit, the second coil of said indicating device responsive to the quotient of the actuating currents, being connected in series with said variable load resistance.

13. A direct reading phasemeter, comprising a circuit which includes two like multiplying thermionic mixer valves for obtaining two products of two oscillations of the same frequency, the plate circuits of said mixers and one pair of their respective inputs being connected in push-pull, while the other pair of the inputs of said valves are connected in parallel, the push-pull plate circuit of said valves comprising two outputs in push-pull; one of said push-pull outputs corresponding to the direct current component proportional to the cosine of the phase-angle of said oscillations, being connected to the control element of an indicating device, while the second of said outputs is connected to means for selectively amplifying a second harmonic oscillation component, said selective amplifying means being coupled to rectifying means, the rectified current output thereof being also connected to said control element of said indicating device responsive to the quotient of the actuating currents.

14. A direct reading phasemeter, comprising a circuit which includes two like multiplying thermionic mixer valves for obtaining two products of two oscillations of the same frequency, the plate circuits of said mixer valves being connected in push-pull, one pair of the respective grids of said valves being connected in parallel and constituting the input for one of said oscillations, while one of the other pair of the respective grids of said valves constituting the second input for the second oscillation is provided with a phase inverter, the push-pull plate circuit of said mixer valves comprising two outputs in push-pull; one of said push-pull outputs corresponding to the direct current component proportional to the cosine of the phase-angle of said oscillations, being connected to the control element of an indicating device, while the second of said outputs is connected to means for selectively amplifying a second harmonic oscillation component, said selective amplifying means being coupled to rectifying means, the rectified current output thereof being also connected to said control element of said indicating device responsive to the quotient of the actuating currents.

15. A direct reading phasemeter of constant calibration for any frequency, comprising a circuit which includes two like multiplying thermionic mixer valves for obtaining two products of two oscillations of the same frequency, the plate circuits and the signal grids of said valves being connected in push-pull, while the oscillator grids of said valves are connected in parallel, each of said plate circuits being constituted by a parallel combination of an alternative-current branch and a choke-resistance branch for continuous current, one of a pair of coils of the control element of an indicating device being connected across said continuous current branch; said plates of said valves being coupled to a resonant circuit constituted by an inductance and a variable tuning condenser connected in parallel, said resonant circuit being coupled to a double diode rectifying circuit provided with a variable load resistance, arranged in tandem with said variable tuning condenser, in order to maintain over all frequencies a constant ratio between the impedance of the resonant circuit and the resistance of the rectifier circuit, the second coil of said control element being connected across said variable load resistance.

EDOUARD LABIN.